United States Patent [19]

Gátmezei et al.

[11] Patent Number: 4,583,216
[45] Date of Patent: Apr. 15, 1986

[54] CONNECTION SYSTEM FOR THE SUPERVISION OF TELEPHONE CIRCUITS

[75] Inventors: József Gátmezei, Martonvásár; József Peszleg; Vendel Englert, both of Budapest, all of Hungary

[73] Assignee: BHG Hiradastechnikai Vallalat, Budapest, Hungary

[21] Appl. No.: 561,326

[22] Filed: Dec. 14, 1983

[30] Foreign Application Priority Data

Dec. 14, 1982 [HU] Hungary ............................. 4027/82

[51] Int. Cl.[4] ........................... H04J 1/16; H04J 3/14; H04Q 11/04
[52] U.S. Cl. ........................................ 370/14; 370/58; 370/17
[58] Field of Search ....................... 370/13, 14, 17, 58; 179/175.2 C

[56] References Cited

U.S. PATENT DOCUMENTS 3,824,548  7/1974  Sullivan et al. ........................ 370/17
3,916,123  10/1975  Werner et al. ............... 179/175.2 C
3,920,919  11/1975  Aillet ..................................... 370/13
3,936,609  2/1976  Waldeck .............................. 370/13
4,103,108  7/1978  Munter ................................ 370/17
4,266,292  5/1981  Regan et al. ......................... 370/13
4,371,758  2/1983  Ulrich .......................... 179/175.2 C

FOREIGN PATENT DOCUMENTS 614580  11/1979  Switzerland .

Primary Examiner—Douglas W. Olms
Assistant Examiner—Wellington Chin
Attorney, Agent, or Firm—Karl F. Ross; Herbert Dubno

[57] ABSTRACT

Subject of the invention is a connection system suitable for supervision of large number of telephone circuits based on efficiency measurements.

In addition to the holdings the talking state of the circuits is also determined and discounted from the line signals of the examined line connections. The ratio of the holdings and the number of calls is regarded as the efficiency of the circuit. The so-obtained efficiency values are compared to the matrix of the "holding-call" corresponding to the circuit. In case of deviation the circuit is qualified to be faulty.

4 Claims, 1 Drawing Figure

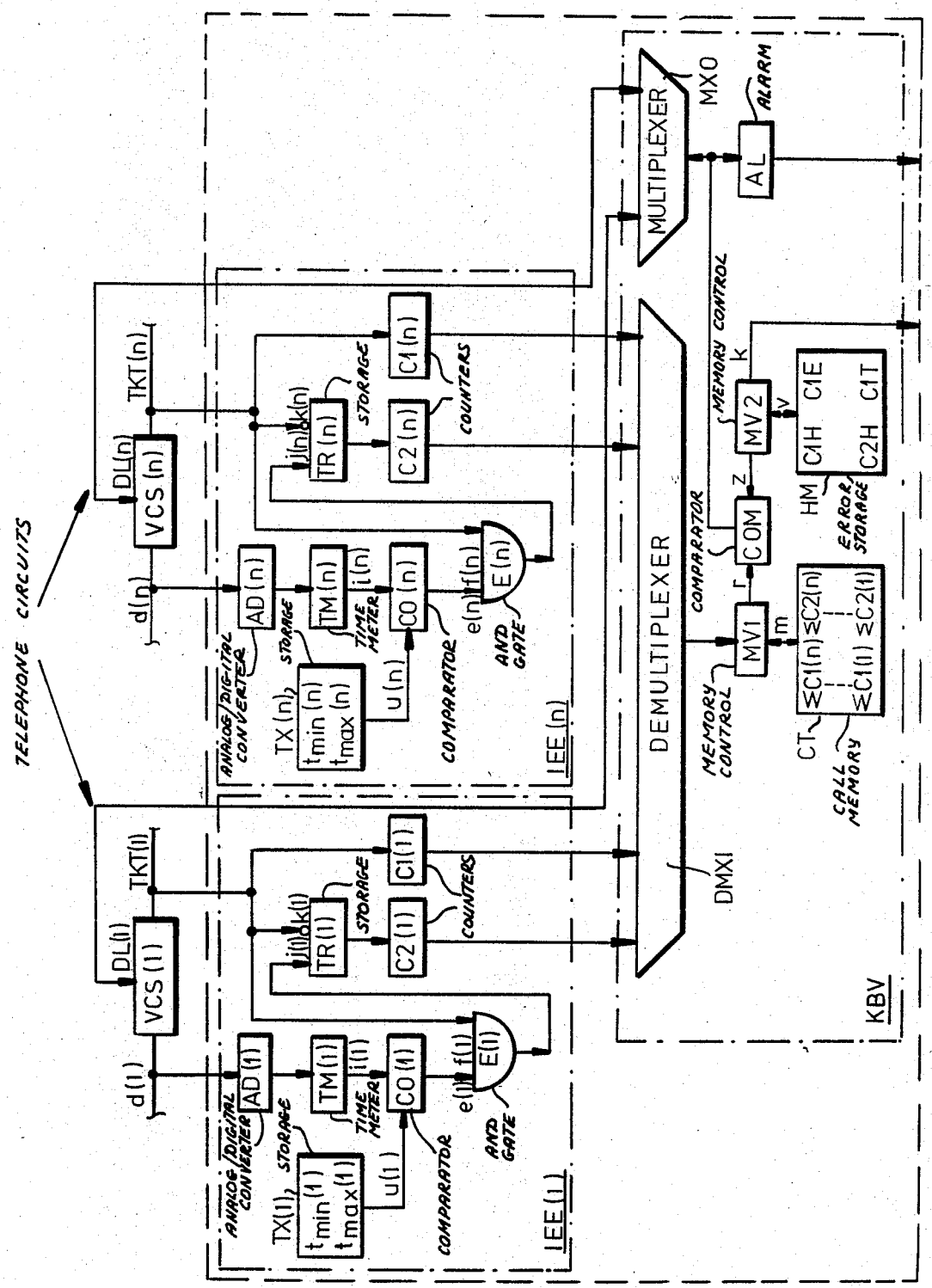

CONNECTION SYSTEM FOR THE SUPERVISION OF TELEPHONE CIRCUITS

FIELD OF THE INVENTION

Our present invention relates to a connection system for the supervision of a large number of telephone circuits based on efficiency measurements.

BACKGROUND OF THE INVENTION

Several apparatuses are known in the technical literature for the supervision of telephone circuits, line connections. The correct operation of the circuits is generally characterized by the average holding time of the circuits.

Accordingly the statistical monitoring of the holding time of the circuits is performed by the apparatus described in the U.S. Pat. No. 3,916,123. The drawback of this solution is that— owing to the factors influencing the holding time—faulty circuits can be indicated only in case of extreme holding time maintained over a long period. The drawback is eliminated by the Swiss Pat. No. 615,790. According to this solution in addition to the nomal holdings (line seizures or usages), those exceeding a certain time are counted separately. The holdings exceeding a given time limit are regarded as effective holdings. The ratio of the holdings and effective holdings compared with the holding ratio of a group ensures the indication of the faulty circuits. However the solution did not eliminate the extremely extensive range of the times necessary for establishing the connection, thus selection of the threshold time is difficult, and the frequently occuring disconnection based on the timing, i.e. the connection exceeding the threshold is also regarded as effective.

An apparatus suitable for supervision of the sub-exchanges is known from the Swiss Pat. No. 614 580. This apparatus is connected to the wire characteristic to holding of the supervised circuit and to the wire relaying the pulses related to the tariff. The ratio of the holdings and the tariff indicates whether the examined circuit is faulty or not.

The shortcoming of the solution is that the range of the tariff pulses for each holding (line seizure or usage) is very extensive in the public network, consequently the circuit can be regarded as faulty only in case of considerable deviation of the ratio.

OBJECT OF THE INVENTION

The object of our invention is to eliminate the mentioned shortcomings and provide a faster and more accurate detection of faults.

SUMMARY OF THE INVENTION

This is realized in that in addition to the holdings the talking state of the circuits is also determined and discounted from the line signals of the examined line connections. The ratio of the holdings (line seizures or usages) and the number of calls is regarded as the efficiency of the circuit. The so-obtained efficiency values are compared to the matrix of the "holding-call" corresponding to the circuit. In case of deviation the circuit is qualified to be faulty.

In the connection system according to the invention the wire characteristic to the holding of the telephone circuit, e.g. line connection is connected directly or through a counter to one of the inputs of the demultiplexer, as well as to the inverter input of an element characteristic of the existing talking state and to one of the inputs of an element realizing an AND condition. The signal wire of the examined telephone circuit is connected directly or through an analog-digital converter to the input of the time meter, the outut of which is connected to one of the inputs of a first comparator. A signal minimum and signal maximum storage unit is connected to the other input of this first comparator, while its output is interconnected with the other input of the element realizing the AND condition.

The output of the element realizing the AND condition is connected to the other input of the storage unit for the existing talking state. The output of the storage unit for the existing talking state is interconnected directly or through a second comparator with the other input of the demultiplexer. The output of the demultiplexer is connected to the input of the first memory control unit, the data transfer wires of which are interconnected with the input of the second comparator. The further data transfer wires of the first memory control unit are connected to the circuit storing the nember of holdings and calls, while the data transfer wires of the second memory control unit to the second comparator, and further data transfer wires are connected to the error matrix storage unit. The output of the second comparator is connected to the input of the alarm circuit and the output of the alarm circuit to the alarm system of the telephone exchange.

The output of the second comparator is connected to the input of the demultiplexer, the output of which is interconnected with the inhibiting input of the examined telephone circuit.

An advantage of the connection system according to the invention is that it processes only the effective holding states, since it relays after the first comparator only those signals of different length appearing on the same signal wire, which are between the suitably selected values stored in the signal minmum and signal maximum storage unit, i.e. those signals which appear simulataneously with the signals on the wire characteristic to the holding state of the given circuit. It is thus suitable for determining the efficiency of such circuits which have no wire for this purpose. The connection system is suitable for the supervision of central circuits too, provided that the efficiency of the central circuits is interpreted as the ratio of the fault signals indicating the holding state and the faulty connections. In this application method instead of the signal wire of the line connections, the wire characteristic to the false connection of the central circuit is connected to the input of the time meter, while instead of the wire characteristic to the holding state of the line connections, the wire characteristic to the holding state of the central circuit is connected to the appropriate places.

With the aid of the connection system according to the invention the individual efficiency of the circuits can be measured, which—after a sufficient length of time following the mesurement—is statistically suitable for identification of the faulty circuits.

BRIEF DESCRIPTION OF THE DRAWING

The apparatus according to the invention is described in detail by way of example with the aid of the accompanying drawing in which the sole FIGURE is a block diagram.

SPECIFIC DESCRIPTION

The diagram shows n telephone circuits VCS(1) ... VCS(n) for the measurement and supervision of line connection. The connection system includes respective counter units IEE(1) ... IEE(n), the number of which is identical with the number of the line connections, and it contains a data processing unit KBV common to all counter units.

The holding counter C1(1) of the counter unit IEE(1) is interconnected with wire TKT(1) characteristic to the holding state of the examined telephone circiut VSC(1), e.g. line connection. The wire TKT(1) is also connected to an inverter input K(1) of the storage unit TR(1) registering the existing talking state of the counter unit IEE(1), as well as to the input f(1) of the element realizing the AND condition E(1). The signal wire d(1) of the examined line connection VCS(1)—depending on the signal to be relayed—is connected through analog-digital converter AD(1), or directly to the input of time meter TM(1). The output of time meter TM(1) is connected to the input i(1) of comparator CO(1), while the signal minimum and signal maximum storage unit TX(1) is connected to the other input u(1) of the comparator CO(1). Such construction is also realizable where a common storage unit belong to each circuit of identical signal limit value. The output of the comparator CO(1) is connected to the second input e(1) of the element realizing the AND condition E(1), the output of which is connected to the input j(1) of the storage unit TR(1) characteristic to the existing talking state. The output of the storage unit TR(1) is interconnected with the input of the counter C2(1) counting the effective states. Outputs of the counters C1(1) and C2(1) of the counter unit IEE(1) are connected to each input of the demultiplexer DMXI of the data processing unit KBV. In case of an examined circuit consisting of n-units, a demultiplexer input of 2n terminals is necessary. The data output wire of the demultiplexer DMXI is connected to the input of the memory control unit MV1. The data transfer wire r of the memory control unit MV1 is connected to one of the inputs of the second comparator COM, while its data transfer wire m is connected to the circuit CT storing the number of holdings and calls.

The connection system is provided with another memory control, unit MV2, the data transfer wire z of which is connected similarly to the comparator COM, and whose other data transfer wire v to the error matrix storage unit HM. The memory control unit MV2 is provided with an output k as well, on which the address of the faulty circuit can be read.

According to a possible construction of the connection system the counters C2(1) ... C2(n) and/or the counters C1(1) ... C1(n) are arranged in the circuit storing the number of holdings (line seizures or usages) and calls CT. In this case the states are counted through the demultiplexer DMXI by the memory control unit MV1. The circuit storing the number of holdings and calls CT and the error matrix storage unit HM can be arranged in a common memory unit, when this memory unit is controlled by a common memory control unit. Thus the data flow rate is more intensive partly towards the comparator COM and partly between the common memory control unit and demultiplexer DMXI, which considerably increases the rate of data processing. when a large number of points are examined it is expedient to displace the counters C1(1) ... C1(n) and C2(1) ... C2(n). At a given technological level the selection between the high-speed common memory unit or displaced counters C1(1) ... C1(n) and C2(1) ... C2(n), as well as between the separate circuit storing the number of holdings and calls CT and the error matrix storage unit HM is to be made on the basis of economic considerations.

Output of the comparator COM is connected partly to the input of an, alarm circuit AL, and partly to the input of the multiplexer MXO. The alarm system of the telephone exchange is connected to the output of the alarm circuit AL. The outputs of the multiplexer MXO are connected to the inhibiting wires of the examined telephone circuits VCS(1), e.g. to the inhibiting wire DL(1) of the line connection.

Operation of the connection system according to the invention is the following:

The counter C1(1) ... C1(n) counts each holding or line seizure and relays the data n to the demultiplexer DMXI, which feeds the data into the storage unit CT. The wire TKT(1) ... TKT(n). permits the insertion of storage unit TR(1) ... TR(n) characteristic to the existing talking state through the element and gate E(1) ... E(n) realizing the AND condition. The holding signal relayed on wire TKT(1) ... TKT(n) and the ouput signal of comparator CO(1) ... CO(n) triggers the storage unit TR(1) ... TR(n). Upon disconnection of the examined circuit the signal relayed on wire TKT(1) ... TKT(n) is cleared and this in turn clears the storage unit TR(1) ... TR(n). The analogu-digital converter AD(1) ... AD(n) connected to the signal wire d(1) ... d(n) relaying the line signal matches the line signal to the input of time meter TM(1) ... TM(n). Time meter TM(1) ... TM(n) measures the signals running on the line and the comparator CO(1) ... CO(n) connected to its output compares the measured signals against the $t_{min}(1) ... t_{min}(n)$ and $t_{max}(1) ... t_{max}(n)$ values in the signal minimum and signal maximum storage unit TX(1) ... TX(n). Signal appears on the output of comparator CO(1) ... CO(n) when at least one pulse between the limit values of the storage unit TX(1) ... TX(n) was among the signals running on the line. If the values of the signal minimum and signal maximum storage unit TX(1) ... TX(n) are set to the limit values of the line signal indicating receiver lifted at the caller, then the number of holdings and connections in the examined circuits can be recorded. The counter C2(1) ... C2(n) connected to the output of storage unit TR(1) ... TR(n) characteristic to the existing talking state counts the number of talking states. The storage unit TR(1) ... TR(n) ensures only one counting of the talking state within one holding, namely it is a frequently occurring solution that the line signal of receiver lifted at the telephone and the line signal of the tariff pulses coincide. Data of the counters C1(1) ... C1(n) and C2(1) . . . C2(n) are relayed to the demultiplexer DMXI in such a way, that the demultiplexer DMXI challenges the counters C1(1) ... C1(n) and C2(1) ... C2(n) one after the other. The obtained data are fed through the memory control unit MV1 into the circuit CT storing the number of holdings and calls. The error matrix storage unit HM contains the number of line seizures and the expected effective states (e.g. talking state) pertaining to the examined line.

The memory control unit MV2 feeds the value of the minimal holding C1E in the error matrix storage unit HM into the comparator COM. Meanwhile the memory control unit MV1 too feeds the value $\Sigma C1(1) ... C1(n)$ in storage unit CT into the comparator COM. The comparator COM compares these two values. If $\Sigma C1(1) \ldots C1(n) < C1E$, the comparison process is interrupted and the memory control units step onto the next line connection. If $\Sigma C1(1) \ldots C1(n) > C1E$, the value $\Sigma C1(1) \ldots C1(n)$ allocates the appropriate address C1H in the error matrix atorage unit HM. The error value C2H corresponding to the address C1H is relayed through the memory control unit MV2 into the comparator COM, while the memory control unit MV1 feeds the value $\Sigma C2(1) \ldots C2(n)$ in storage unit CT similarly into the comparator COM. If $\Sigma C2(1) \ldots C2(n) > C2H$, then it emits signal towards the alarm circuit AL. Following the comparison the memory control unit MV2 feeds the cycle limit value C1T in the error matrix storage unit HM into the the comparator COM which compares it against the value $\Sigma C1(1) \ldots C1(n)$, and if $\Sigma C1(1) \ldots C1(n) \geq C1T$, the memory control unit MVL deletes the stored value $\Sigma C1(1) \ldots C1(n)$.

In case of alarm the examined circuit is blocked through the multiplexer MXO connected to the output of comparator COM, which is connected to the inhibiting input $DL(1) \ldots DL(n)$ of the examined telephone circuits $VCS(1) \ldots VCS(n)$.

What we claim is:

1. A connection system suitable for the supervision of telephone circuits, $VCS(1) \ldots VCS(n)$, each having a signal wire $D(1) \ldots D(n)$ and a further wire $TKT(1) \ldots TKT(n)$ indicating the seizure of the respective telephone circuit, said system comprising:

a demultiplexer DMXI having inputs operatively connected to each of said telephone circuits $VCS(1) \ldots VCS(n)$ at the respective line-seizure wire $TKT(1) \ldots TKT(n)$;

a respective analog/digital converter $AD(1) \ldots AD(n)$ connected to each of said signal wires;

a respective time meter $TM(1) \ldots TM(n)$ connected to an output of each of said analog/digital converters $AD(1) \ldots AD(n)$;

a respective signal maximum and signal minimum storage unit $TX(1) \ldots TX(n)$ storing respective minimum and maximum times assigned to each of said telephone circuits $VCS(1) \ldots VCS(n)$;

a respective first comparator $CO(1) \ldots CO(n)$ receiving inputs from the respective time meter $TM(1) \ldots TM(n)$ and from the respective signal minimum and signal maximum storage unit $TX(1) \ldots TX(n)$;

respective AND gates $E(1) \ldots E(n)$ receiving inputs from the respective first comparator and the respective line-seizure wire for generating an output representing the existence of a talking state and applying same to the demultiplexer;

a first memory transfer unit MV1 connected to said demultiplexer DMXI;

a circuit CT storing a number of line seizures and calls connected to said memory control unit MV1;

a second memory control unit connected to an error matrix storage unit;

a second comparator COM receiving inputs from both of said memory control units MV1 and MV2; and an alarm circuit AL connected to an output of said second comparator COM and connected in turn to an alarm system of a telephone exchange in which said telephone circuits are provided.

2. The connection system defined in claim 1 wherein said line-seizure wire $TKT(1) \ldots TK(n)$ of each of said telephone circuits $VCS(1) \ldots VCS(n)$ is connected to a respective input of said demultiplexer DMXI by a first counter $C1(1) \ldots C1(n)$, the output of each AND gate $E(1) \ldots E(n)$ is connected to one input $J(1) \ldots J(n)$ of a respective talking state storage unit $TR(1) \ldots TR(n)$, and the output of each talking state storage unit $TR(1) \ldots TR(n)$ is connected to a second input of said demultiplexer DMXI assigned to the respective telephone circuit $VCS(1) \ldots VCS(n)$.

3. The connection system defined in claim 2 wherein the output of said second comparator COM is connected to an input of a multiplexer MXO, said multiplexer MXO having outputs connected to respective inhibiting inputs $DL(1) \ldots DL(n)$ of the respective telephone circuits $VCS(1) \ldots VCS(n)$.

4. The connection system defined in claim 2 wherein a common storage unit TX is applied to each circuit of identical signal limit value.

* * * * *